United States Patent [19]

Snarski

[11] 4,203,958

[45] May 20, 1980

[54] PROCESS FOR PRODUCING OXYGEN-FREE NITROGEN ATMOSPHERE

[75] Inventor: Thomas R. Snarski, Saginaw, Mich.

[73] Assignee: General Motors Corporation, Detroit, Mich.

[21] Appl. No.: 883,598

[22] Filed: Mar. 6, 1978

[51] Int. Cl.$^2$ ............................................. C01B 21/00
[52] U.S. Cl. ....................................... 423/351; 55/25; 55/26
[58] Field of Search ...................... 423/351; 55/25, 26, 55/59, 62

[56] References Cited

U.S. PATENT DOCUMENTS 3,140,931   7/1964   McRobbie ............................. 55/25

Primary Examiner—Delbert E. Gantz
Assistant Examiner—Gregory A. Heller
Attorney, Agent, or Firm—Lawrence B. Plant

[57] ABSTRACT

Carbonaceous combustion products (i.e., principally carbon dioxide) and water are removed from nitrogen generator gas by molecular sieve adsorption thereof. The molecular sieve material is regenerated by an initial extended purging with ambient air under vacuum followed by a short burst of pure nitrogen under vacuum to remove any entrapped oxygen.

2 Claims, 1 Drawing Figure

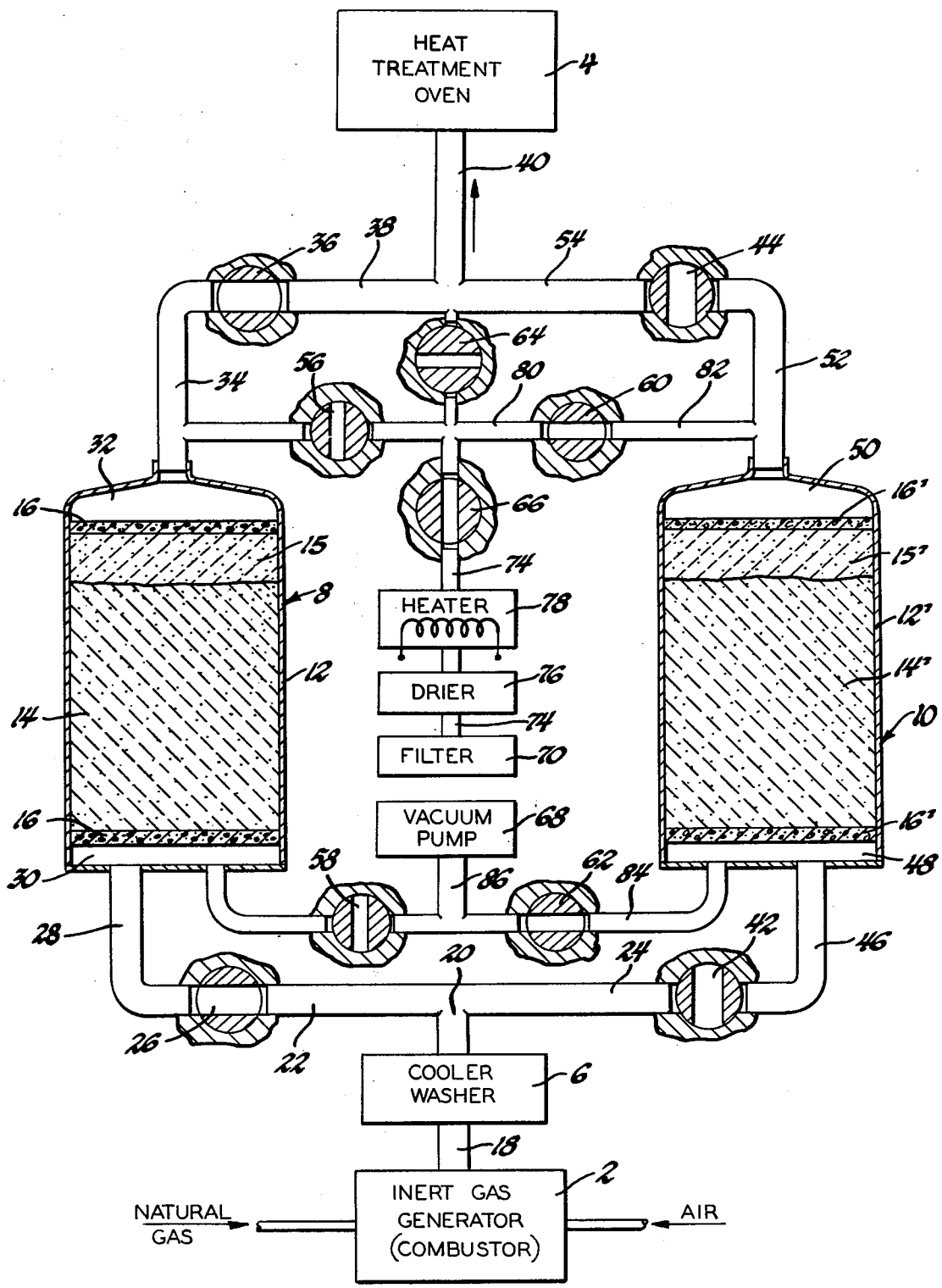

PROCESS FOR PRODUCING OXYGEN-FREE NITROGEN ATMOSPHERE

This invention relates to oxygen-free nitrogen atmosphere systems, and more specifically to oxygen-free nitrogen atmosphere systems wherein contaminants are removed from the nitrogen by molecular sieve adsorption. The invention is most particularly applicable to systems for providing substantially oxygen-free nitrogen atmospheres to metallurgical heat treating ovens.

BACKGROUND OF THE INVENTION

Many industrial processes require oxygen-free nitrogen atmospheres. One such process, for example, is heat treating where the presence of oxygen for a prolonged period at high oven temperatures can deleteriously affect the parts being treated. Accordingly, heat treaters and the like have taken great pains to prevent the infiltration of air into their nitrogen environmental system. Typically, nitrogen is provided for such processes by nitrogen gas generators in which a combustible gas (e.g. natural gas) is burned with air to produce principally nitrogen, water and carbonaceous products (i.e., principally $CO_2$ with small amounts of CO). The gas generator effluent is normally cooled, washed, dried and carbonaceous products removed (i.e., hereafter decarbonized) to yield the desired nitrogen atmosphere. Washing and cooling of the gas generator effluent is usually effected by passing it through a gas-liquid contact device such as a counterflow packed bed, or spray chamber where it is contacted with water resulting in a lowering of its temperature and saturation thereof (i.e., about 80° F. dew point). The drying and decarbonizing is thereafter effected by passing the gas through gas separators containing conventional molecular sieve (e.g., synthetic zeolites) and desiccant (e.g., activated alumina) adsorbent beds which trap the water and carbonaceous molecules while permitting the smaller nitrogen molecules to pass. The molecular sieves and desiccants, however, have a limited capacity, eventually become saturated with adsorbate and must be regenerated. Accordingly, and in order to ensure a continuous flow of the pure nitrogen to the treatment area (e.g., heat treating ovens), it is customary to provide at least two of the gas separators, plumbed in parallel such that one of the spearators can be purifying the nitrogen (i.e., adsorption mode) while the other is being regenerated (i.e., desorption mode). Appropriate automatically controlled valves are provided for alternately shifting back and forth between the separators so as to ensure the desired continuous flow. In order to ensure an oxygen-free nitrogen atmosphere for the ovens, regeneration of the separators has traditionally been accomplished by evacuating one of the separators (i.e., about 26 in. of Hg.) and flushing it with a portion (i.e., about 20%) of the pure nitrogen being generated from the other separator, then undergoing its adsorption mode. One such system is disclosed in Meyer U.S. Pat. No. 3,891,411. Significant savings in nitrogen generation and conservation of precious natural gas can be achieved if the amount of nitrogen used for regeneration could be reduced.

It is an object of the present invention to provide a molecular-sieve-purified, oxygen-free, nitrogen gas atmosphere generation system wherein only minimum quantities of the nitrogen gas generated is required for regeneration of the molecular sieve material. This and other objects and advantages of the present invention will become more readily apparent from the detailed description thereof which follows.

BRIEF DESCRIPTION OF THE INVENTION

The FIGURE schematically illustrates a nitrogen atmosphere heat treating system employing one embodiment of the adsorption-desorption scheme of the present invention. In accordance with the present invention, and as part of an otherwise conventional nitrogen atmosphere system as described above, ambient air at reduced pressure (i.e., vacuum) is admitted to each molecular sieve separator during most of its regeneration/desorption cycle to dry and decarbonize it, and thereafter a short burst (e.g., about 10% of the regeneration cycle) of pure nitrogen from the adsorbing separator is admitted to the separator near the end of its desorption cycle to purge the separator of air.

DETAILED DESCRIPTION OF THE INVENTION

The drawing illustrates a system in accordance with the present invention in which a conventional nitrogen generator 2 burns natural gas and air to yield a generator gas comprising about 9% to 10% carbon dioxide ($CO_2$), a minor amount of carbon monoxide (CO), water ($H_2O$), and the balance nitrogen. The generator gas emanating from the generator 2 must be cooled, cleaned, dried and decarbonized before use in the heat treatment oven 4. Cooling and cleaning is conveniently accomplished in a conventional gas-liquid contact device 6 such as a packed bed or spray tower as are well known in the art for this purpose. Thereafter, the clean, cooled and now $H_2O$-saturated gas is treated in the adsorption-type gas separator system shown which includes at least two gas separators 8 and 10 (though more may be used, of course). The gas separators 8 and 10 are of the molecular sieve type which generally comprise a vessel 12, a packed adsorbent bed 14 of molecular sieve pellets or powder, an optional desiccant 15 such as pelletized alumina, and means 16 (e.g., porous plates or the like) for distributing the gas substantially uniformly across the inlet and outlet ends of the vessel 12 to prevent channeling it through the molecular sieve and drier beds 14 and 15.

The molecular sieve material comprising the adsorbent bed 14 may be any such material as is known to those skilled in the art for this purpose and which selectively adsorbs carbon dioxide, carbon monoxide and water-sized molecules while permitting the smaller nitrogen molecules to pass through without being trapped. Naturally occurring zeolites, for example, are useful here, but the more uniform and economical synthetic alkali metal alumino silicates marketed by the Union Carbide Corporation (i.e., Linde Division) are preferred. One specifically preferred material is the calcium form of the alkali metal alumino silicate marketed as Linde Molecular Sieve Type 5A which has the general chemical formula $Ca_{4.5}Na_3 [(AlO_2)_{12}(SiO_2)_{12}] \cdot XH_2O$ and which has the capability of adsorbing molecules with critical diameters up to 5 angstroms. The precise nature and mechanism of molecular sieve adsorbency need not be dwelled on herein as it is well known to those skilled in the art and is readily available in the literature including such publications as "Linde Molecular Sieves" published and distributed by the Union Carbide Corporation.

The adsorption system is plumbed with the separators 8, 10 in parallel such that one of the separators 8 operates in its adsorption mode and is in series with the gas flow between the nitrogen generator 2 and the oven 4, while the other separator 10 undergoes desorption regeneration of the sieve material 14 and desiccant 15. After a prescribed time interval the roles of the separators 8, 10 are automatically reversed such that separator 8 is regenerated while separator 10 performs the adsorption function. More specifically, the plumbing includes pneumatically or electrically operated valves automatically controlled by timers, or the like, to program their respective opening/closing according to a prescribed schedule, and designed to provide a continuous flow of gas from the generator 2 to the oven 4 by shifting the generator gas flow alternately back and forth between the separators 8 and 10 such that each undergoes adsorption while the other is undergoing desorption.

Adsorption

According to the specific arrangement shown in the drawing, separator 8 is in its adsorption mode while separator 10 is in its regeneration mode and the gas from the nitrogen generator 2 passes into duct 18 through cooler 6 to tee 20 from where it flows through duct 22, open valve 26, duct 28, end 30 of the separator 8, through the sieve and desiccant beds 14 and 15, out the other end 32 of the separator 8, through duct 34, valve 36, duct 38 and duct 40 to the oven 4. When the separator 8 has adsorbed all of the water and carbonaceous materials that it can, or is scheduled to adsorb, the valves 26 and 36 are closed and valves 42 and 44 opened to shift the generator gas flow through the duct 24, valve 42, duct 46, end 48 of separator 10, the sieve and desiccant beds 14' and 15', out of the end 50 of the separator 10 through the duct 52, valve 44, duct 54, duct 40 and finally to the oven 4. Substantially concurrently with the shifting of the nitrogen gas flow from separator 8 to separator 10, the valves of the regeneration system are actuated to effect regeneration of separator 8.

Regeneration

The regeneration system includes automatically controlled valves 56, 58, 60, 62, 64 and 66, vacuum pump 68, air filter 70 for air inlet duct 74, and optionally, as may be needed, a desiccant cannister 76 and/or heater 78. Decarbonizing and drying of the beds 14' and 15' in the separators (i.e., separator 10 in the drawing) is primarily effected by drawing a vacuum in the vessel 12' by means of vacuum pump 68, while at the same time opening valves 60, 62 and 66 such that ambient air is drawn through the duct 74, valve 66, duct 80, valve 60, duct 82, duct 52, separator end 50, beds 15' and 14', end 48, duct 84, valve 62, duct 86, vacuum pump 68 and finally discharged to the ambient. While this purging air is being drawn, the valve 64 may be left closed to admit only air to the separator 10 or may be opened to mix some of the $N_2$ from the separator 8 with the air purge.

In any event, whether the decarbonizing and drying flushing is effected solely by the ambient air or by an air-$N_2$ mixture, the flushing continues for most, but not all, of the regeneration cycle. Near the end of the regeneration cycle of separator 10, and just prior to shifting the generator gas flow thereto, air inlet valve 66 is closed and $N_2$ inlet valve 64 is opened (or left opened as the case may be) such that only pure nitrogen from the duct 38-54 is drawn through the beds 15'-14' of the separator 10 during the terminal portion, or final moments, of the regeneration cycle to flush any residual oxygen therefrom before putting the separator 10 back on its adsorption cycle.

By way of example, tests were performed on an existing commercial installation in which about 20,000 CFH of air was burned with about 2300 CFH of natural gas in a $N_2$ generator to yield generator gas having a temperature of about 1200° F., a dew point of about 80° F., a $CO_2$ content of about 9% to 10% by volume and a CO content of about 1.5% to 2.8% by volume. This normally produced about 15,000 CFH of $N_2$ available to the ovens after drying, decarbonization and regeneration. The generator gas was washed and cooled to a temperature of about 70° F., and a dew point of about 65° F. The pressure in the system was about +18 inches of water. The separators each contained about 98 ft.$^3$ of Linde 5A synthetic zeolite sieve material (i.e., $\frac{1}{8}$" dia. pellets) and about 12 ft.$^3$ of activated alumina desiccant (i.e., $\frac{1}{4}$" dia. balls). Before the present invention, this system utilized about 15% or 20% of the dried and decarbonized $N_2$ to regenerate the spent molecular sieve and desiccant materials with a consequent unnecessary loss not only of that amount of $N_2$ but of a corresponding amount of natural gas (i.e., about 400–500 CFH). Utilizing an air purge according to the present invention, the amount of $N_2$ required for regeneration was significantly reduced without polluting the $N_2$ sent to ovens with oxygen.

Test 1

The aforesaid commercial installation was modified to admit ambient air (i.e., about 80° F. and 20°–60° F. dew point) to the diverted $N_2$ used for regeneration to provide a mixed purge gas comprising about four parts by volume air to one part by volume nitrogen for an $N_2$ saving of 80% during the initial portion of the regeneration cycle. This 4:1 mixture was drawn through the separator for about $4\frac{1}{2}$ minutes under a vacuum of about 26 inches of mercury. At the end of the $4\frac{1}{2}$ minutes, the air inlet valve was closed and purging continued for another 30 seconds using only the $N_2$ bled off from the separator then in its adsorption mode. Thereafter, the separator was repressurized to the adsorption system pressure of 18 inches of water and was ready for adsorber service. The same procedure was repeated over and over alternating between separators every five (5) minutes for a period of seven hours. Gas analysis was performed immediately after the regenerated separator was returned to adsorber service and showed an acceptable average $CO_2$ content of about 0.3% by volume, a dew point of about −50° F. to −70° F. and no detectable oxygen.

Test 2

Another test was performed as above except that the $N_2$ bleed-off valve from the adsorbing separator was closed and only air was admitted to the regenerating separator for $4\frac{1}{2}$ minutes. This air was not flushed from the separator with $N_2$ at the beginning of the adsorption cycle. During the 17 hours of the test under these conditions, the gas had an average of about 0.2% to 0.3% $CO_2$, a dew point of about −45° F. to −60° F. and an oxygen level of about 0.1%.

Test 3

Test No. 2 was continued for another four (4) days, but a 30 second burst of $N_2$ was admitted to the regeneration separator from the N$_2$ bleed valve following the 4½ minute air-purge. This test yielded a gas having undetectable amounts of CO$_2$ and O$_2$, and a dew point of about $-35°$ F.

Other tests showed that the O$_2$ could be removed from the regenerating separator with N$_2$ bursts of durations as short as five (5) seconds. However, due to variations in the operating equipment, ambient atmosphere and other uncontrollable variables found in normal commercial operations, this level was not always sufficient to ensure consistent removal of the O$_2$. Accordingly, a 20 second to 30 second N$_2$ burst is considered desirable to provide a wide safety margin against O$_2$ pollution of the nitrogen.

While this invention has been disclosed primarily in terms of a specific embodiment thereof, it is not intended that it be restricted thereto, but rather only to the extent set forth hereafter in the claims which follow.

I claim:

1. In the process of generating a substantially O$_2$-free, decarbonized nitrogen atmosphere including the principal steps of (a) burning a combustible gas in a generator in the presence of air to yield a generator gas comprising nitrogen, carbonaceous products and water, (b) scrubbing the generator gas with water to clean and cool it, (c) passing the scrubbed gas through an adsorbent bed for adsorbing said carbonaceous products and water from said generator gas to yield a substantially O$_2$-free nitrogen effluent, and (d) flushing said bed with said effluent under vacuum to regenerate said bed in a separate desorption cycle, the improvement comprising:

prior to said flushing with said effluent, flushing said bed with an air-rich gas under vacuum for a sufficient time to desorb said adsorbed carbonaceous products and water whereby the duration of said effluent flushing may be reduced to a time sufficient only to purge said bed of said air and conservation of said effluent and said combustible gas is achieved.

2. In the process of producing a continuous supply of substantially O$_2$-free, decarbonized nitrogen including the principal steps of (a) generating nitrogen gas contaminated with carbonaceous products and water, (b) removing said contaminants from said nitrogen by passing said contaminated gas alternately through first and second adsorbent beds to adsorb said contaminants and yield said O$_2$-free decarbonized nitrogen, and (c) alternately regenerating said beds such that said first bed is adsorbing said contaminants while said second bed is being regenerated, the improvement comprising the steps of:

flushing said second bed with air under vacuum for a sufficient time to desorb said contaminants and subsequently flushing said second bed with the O$_2$-free decarbonized nitrogen emitted from said first bed for a sufficient time to flush any residual air from said second bed prior to alternating the respective adsorbing-regenerating roles of said beds.

* * * * *